United States Patent [19]

Wellner et al.

[11] 4,328,330
[45] May 4, 1982

[54] PROCESS FOR THE PRODUCTION OF POLYUREAS

[75] Inventors: Wolfgang Wellner, Cologne; Artur Botta, Krefeld; Hermann Gruber, Leverkusen, all of Fed. Rep. of Germany

[73] Assignee: Bayer Aktiengesellschaft, Leverkusen, Fed. Rep. of Germany

[21] Appl. No.: 260,542

[22] Filed: May 4, 1981

[30] Foreign Application Priority Data

May 10, 1980 [DE] Fed. Rep. of Germany ....... 3018023

[51] Int. Cl.$^3$ .............................................. C08G 18/16
[52] U.S. Cl. ........................................ 528/45; 528/53; 528/52
[58] Field of Search ............................................ 528/45

[56] References Cited

U.S. PATENT DOCUMENTS 3,245,961 4/1966 Fetscher et al. ................... 260/77.5
3,740,377 6/1973 Huffman et al. ..................... 260/75
4,248,756 2/1981 König et al. ........................... 528/45

FOREIGN PATENT DOCUMENTS 1644813 1/1971 Fed. Rep. of Germany .
2722514 11/1978 Fed. Rep. of Germany .

*Primary Examiner*—Maurice J. Welsh
*Attorney, Agent, or Firm*—Gene Harsh; Lawrence S. Pope; Thomas W. Roy

[57] ABSTRACT

The present invention relates to a process for the production of polyureas by reacting organic polyisocyanates containing blocked isocyanate groups with organic compounds containing at least two primary and/or secondary amino groups in the presence of catalysts which accelerate the condensation reaction of the above-mentioned starting materials, characterized in that compounds containing at least one guanidine group corresponding to the following formula:

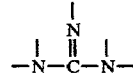

are used as catalysts.

6 Claims, No Drawings

PROCESS FOR THE PRODUCTION OF POLYUREAS

BACKGROUND OF THE INVENTION

1. Field of the Invention

This invention relates to a new process for the production of polyureas by reacting blocked isocyanates with organic compounds containing at least two primary and/or secondary amino groups using guanidines of the type described in more detail below as catalysts for the polycondensation reaction.

2. Description of the Prior Art

The production of high molecular weight compounds containing urea groups using polyisocyanates is known, for example, from German Offenlegungsschrift No. 1,644,813 or U.S. Pat. No. 3,245,961. The polyureas obtainable in accordance with these prior publications are eminently suitable for the production of coatings. The effect of using blocked polyisocyanates instead of the free isocyanates is that the reaction mixtures have a processing time which is long enough for practical requirements. By contrast, corresponding reaction mixtures of the corresponding non-blocked polyisocyanates and the corresponding polyamines would be far too reactive to be used able as binders in two-component lacquers. However, in the case of the systems according to the above-mentioned prior art, the increase in processing time which is made possible by blocking of the isocyanate groups is offset by the disadvantage that the systems are too sluggish in reaction at room temperature to guarantee satisfactory hardening of the lacquer coatings produced therefrom.

Extremely effective catalysts for the above-mentioned reaction are described in German Offenlegungsschrift No. 2,722,514. However, the amidines proposed as reaction accelerators in this prior publication are attended by the disadvantage that they are sensitive to hydrolysis. The activity thereof in modified practical mixtures is lost in the event of prolonged storage so that they have to be added to the mixtures as a third component just before they are used.

Accordingly, an object of the present invention is to provide reaction accelerators which enable two-component coatings based on blocked polyisocyanates and polyamines to be obtained without the disadvantages attending the hydrolysis-prone amidines.

It has surprisingly been found that this object may be achieved by using compounds containing at least one guanidine group as accelerators for the above-mentioned reaction. In particular, it is possible by the process according to the present invention to produce storable, modified mixtures, for example, with coal tars, having hardening times at room temperature which satisfy practical requirements.

SUMMARY OF THE INVENTION

The present invention relates to a process for the production of polyureas by reacting organic polyisocyanates containing blocked isocyanate groups with organic compounds containing at least two primary and/or secondary amino groups in the presence of catalysts which accelerate the condensation reaction of the above-mentioned starting materials, characterized in that compounds containing at least one guanidine group corresponding to the following formula:

are used as catalysts.

DETAILED DESCRIPTION OF THE INVENTION

The polyisocyanates containing blocked isocyanate groups used in accordance with the present invention are the polyisocyanates known from polyurethane chemistry, the isocyanate groups of which are blocked by the blocking agents known in polyurethane chemistry. The blocked polyisocyanates used in accordance with the present invention are preferably linear or branched compounds containing carbamic acid aryl ester groups and having a molecular weight of from about 500 to 10,000, the production of which is described, for example, in German Offenlegungsschrift No. 2,152,606 or U.S. Pat. No. 3,715,338. According to the teachings of these two prior publications, these known compounds containing carbamic acid aryl ester groups are preferably obtained by reacting the corresponding polymerization or polycondensation products containing isocyanate groups with phenol or phenol derivatives, preferably in stoichiometric quantitative ratios, optionally at elevated temperatures and in the presence of the conventional catalysts, such as tertiary amines and/or tin compounds.

The polymerization or polycondensation products (isocyanate prepolymers) containing isocyanate groups may in turn be obtained by reacting the corresponding polymerization or polycondensation products containing hydroxyl, amino or sulphydryl groups, such as preferably the conventional polyethers, polythioethers, polyesters, polyacetals or polyester amides containing hydroxyl groups, with diisocyanates or higher polyisocyanates, for example, in an NCO/OH ratio of from about 1.5:1 to 2.5:1 or with a large excess of isocyanate and subsequently removing the excess isocyanate, for example, by thin layer distillation. In this connection it is preferred to use the aromatic diisocyanate mentioned in the literature references cited above, because carbamic acid aryl esters containing aromatically bound carbamic acid aryl ester groups are preferably used in accordance with the present invention.

The polymerization or polycondensation products containing isocyanate groups which are obtained in known manner from the above-mentioned components are subsequently reacted in known manner, preferably with phenols, preferably in stoichiometric quantities, to form carbamic acid aryl esters. This reaction is advantageously carried out at elevated temperatures, preferably from about 50° to 120° C., and optionally in the presence of the catalysts conventionally used in isocyanate chemistry, such as tertiary amines and/or compounds of divalent or tetravalent tin.

In addition to phenol itself, a large number of substituted phenols are suitable for use in the production of the carbamic acid aryl esters. Examples include o-, m- and p-cresol, cresol mixtures, the isomeric xylenols, 2-sec.-butyl phenyl, 4-tert.-butyl phenol, 4-(1,1,3,3-tetramethylbutyl)-phenol, 4-cyclohexyl phenol, 4-nonyl phenol mixtures with branched nonyl residues, or dodecyl phenol mixtures, of the type obtainable, for example, by the addition of corresponding olefins with phenols in the presence of Friedel Crafts catalysts.

Phenol or lower alkyl-substituted ($C_1$-$C_3$) phenols generally escape from the process products. This may result in the release of a noxious odor in addition to endangering health and producing an unfavorable reduction in mass. For this reason, it is particularly preferred to use phenols substituted by $C_4$-$C_{18}$ alkyl radicals for producing the polymerization or polycondensation products containing carbamic acid aryl ester groups.

Reactants for the polyisocyanates containing blocked isocyanate groups in the reaction accelerated in accordance with the present invention are organic compounds containing at least two primary and/or secondary amino groups, including in particular the compounds containing amino groups which are normally used for hardening polyepoxides, for example, aliphatic, cycloaliphatic or heterocyclic polyamines and polyamidoamines. Preferred aliphatic polyamines are alkyl polyamines corresponding to the following general formula:

$$H_2N(RNH)_nH$$

wherein R represents a difunctional aliphatic hydrocarbon radical containing from 2 to 18, preferably from 2 to 6, carbon atoms or a cycloaliphatic hydrocarbon radical containing from 6 to 15, preferably from 13 to 15, carbon atoms; and n represents an integer of from 1 to 6, preferably 1. The cycloaliphatic polyamines mentioned are used in preference to the aliphatic polyamines.

Examples of suitable polyamines are ethylene diamine, diethylene triamine, hexamethylene diamine and trimethyl hexamethylene diamine. Diprimary cycloaliphatic amines such as 1,4-diaminocyclohexane, 3,3'-dimethyl-4,4'-diaminodicyclohexyl methane and 3,3,5-trimethyl-5-aminomethyl cyclohexylamine (isophorone diamine) are particularly suitable for this process. Other hardeners containing several amino hydrogen atoms are polyamides of an aliphatic or cycloaliphatic polycarboxylic acid with an aliphatic amine, such as the reaction product of linolenic acid dimerized by the Diels Alder method with diethylene triamine in a molar ratio of about 1:2.

The ready-for-use mixture is prepared by mixing the polyisocyanate component containing blocked isocyanate groups with the polyamine and the catalyst used in accordance with the present invention. In general, the quantitative ratios between the reactants are selected in such a way that the reaction mixture contains from about 0.8 to 1.2, preferably about 1, equivalent of primary and/or secondary amino groups per equivalent of blocked isocyanate groups.

The catalysts according to the present invention are generally used in quantities of from about 0.05 to 10%, by weight, preferably about 0.1 to 5%, by weight, based on the total quantity of the above-mentioned reactants.

The reaction accelerators according to the present invention are organic compounds containing at least one guanidine group corresponding to the following formula:

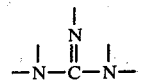

The accelerators used in accordance with the present invention preferably correspond to the following general formula:

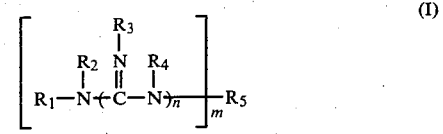

wherein m represents 1 or 2, n represents 1, 2 or 3 when m=1 and n=1 when m=2, $R_1$, $R_2$, $R_3$ and $R_4$ which may be the same or different, represent hydrogen, alkyl, cycloalkyl, aralkyl, alkaryl or aryl radicals which optionally contain inert substituents and/or are interrupted by structural units of the formulae —O—, —S— or =N—$R_6$ ($R_6$ represents $C_1$-$C_4$ alkyl or phenyl) and $R_5$ represents either a monofunctional radical of the type mentioned in the definition of $R_1$ to $R_4$ or an alkylene radical containing from 2 to 4 carbon atoms;

where n=1, two of the radicals $R_1$, $R_2$, $R_3$, $R_4$ and $R_5$ may also be cyclically attached to one another to form guanidines having the following structures:

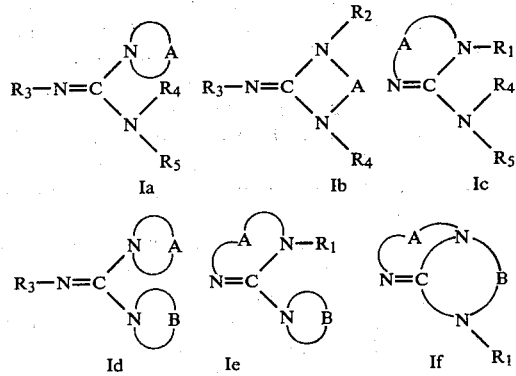

wherein A and B represent at least two-membered divalent aliphatic, cycloaliphatic, araliphatic or aromatic hydrocarbon chains which, in accordance with the foregoing observations, may even be interrupted by hetero atoms and/or may be substituted.

It is particularly preferred in the present process to use those compounds corresponding to general formula (I), (Ia to If) above wherein m and n each represents 1; $R_1$, $R_2$, $R_3$, $R_4$ and $R_5$, which may be the same or different, represent hydrogen; $C_1$-$C_{18}$, particularly $C_1$-$C_4$, aliphatic hydrocarbon radicals optionally containing nitrile groups as substituents; $C_5$-$C_{10}$, particularly $C_5$ or $C_6$, cycloaliphatic hydrocarbon radicals; $C_7$-$C_{15}$, particularly $C_7$ or $C_8$ araliphatic hydrocarbon radicals; or $C_6$-$C_{14}$, particularly $C_6$, aromatic hydrocarbon radicals; and A and B represent the same or different polymethylene radicals containing from 2 to 15 carbon atoms, more particularly from 2 to 4 carbon atoms, which may be interrupted by hetero atoms such as —O—, —S— or =N—R$_6$ (R$_6$ represents C$_1$-C$_4$ alkyl or phenyl).

Compounds which are also suitable, but less preferred, for use as accelerators in accordance with the present invention are compounds corresponding to general formula (I) and (Ia–If) wherein the radicals R$_1$ to R$_5$ and A to B contain substituents, such as halogen, hydroxy amino, C$_1$-C$_4$ alkylamino, di-(C$_1$-C$_4$ alkyl)-amino, C$_1$-C$_4$ alkoxy, phenoxy, C$_1$-C$_4$ alkyl mercapto, C$_1$-C$_4$ alkoxy carbonyl or nitro radicals.

The preferred reaction conditions according to the present invention also include biguanide or triguanide compounds corresponding to the following general formula:

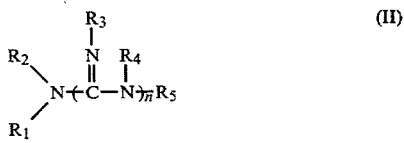

wherein
n represents 2 or 3, and
R$_1$, R$_2$, R$_3$, R$_4$ and R$_5$ are as defined above and, in particular, have the preferred meanings mentioned above.

It is of course also possible to use compounds containing more than one guanidine group in the process according to the present invention, i.e., those compounds corresponding to formula (I) wherein m represents 2, R$_1$, R$_2$, R$_3$ and R$_4$ are as defined above and R$_5$ represents a difunctional hydrocarbon radical, more particularly, a polymethylene radical containing from 2 to 4 carbon atoms.

The activity of the catalysts used in accordance with the present invention may be varied within wide limits. Depending on the choice of the radicals R$^1$, R$^2$, R$^3$, R$^4$, R$^5$, A and B (aliphatic or aromatic character) and on the ring size and degree of branching, it is possible to adapt catalysts having graduated basicity and activity to meet practical requirements.

The catalysts used in accordance with the present invention are known or may be obtained by known methods, cf. for example: Houben-Weyl, Methoden der organischen Chemie, Vol. 8, Sauerstoffverb. III, pages 94 to 95, 98 to 100, 172 to 194; Ber 97., (1969); U.S. Pat. No. 3,923,808; Can. J. Chem. 35, pages 843–9 (1957); Can. J. Chem. 35, pages 9–14 (1957).

The catalysts according to the present invention include, for example, the following guanidine compounds: guanidine, as well as biguanide or triguanide, and optionally mixed N,N,N',N',N"'-mono- to pentamethyl-, ethyl-, (iso)propyl-, (iso)butyl-, (iso)pentyl-, hexyl-, 2-ethylhexyl-, heptyl-, octyl-, dodecyl-, stearyl-, hydroxy methyl-, hydroxy ethyl-, hydroxy pentyl-, hydroxy-ethoxy ethyl-, hydroxy-ethyl mercapto ethyl-, ethoxy propyl-, butoxy hexyl-, cyanoethyl-, cyanopentyl-, butoxy carbonyl methyl-, methoxy carbonyl hexyl-, dimethyl amino propyl-, cyclopentyl-, cyclohexyl-, benzyl-, chlorobenzyl-, phenethyl-, phenpropyl-, dimethylaminophenethyl-, phenyl-, chlorophenyl-, tolyl-, (tert.)-butyl phenyl-, methoxy phenyl-, ethoxy carbonyl phenyl-guanidines or even biguanides or triguanides-2-amino-imidazolines, -2-amino-tetrahydropyrimidines, -2-amino-tetrahydro-1,3-diazepines, methylimino-, ethylimino-, cyanoethylimino-, dibutylaminobutylimino-, hexylimino-, stearylimino-, cyclohexylimino-, benzylimino-, phenethylimino-, phenylimino-, chloro-phenylimino-, tolylimino-carbonic acid-bis-morpholide-bis-piperidide, -bis-hexamethylene-imide, -bis-N'-methyl piperazide, N-methyl-, N-ethyl-, N-(iso)-propyl-, N-(isobutyl)-, N-(iso)-pentyl-, N-hexyl-, N-heptyl-, N-decyl-, N-dodecyl-, N-stearyl-, N-allyl-, N-hexenyl-, N-hydroxyethyl-, N-hydroxy-octyl-, N-[(poly)-hydroxyethoxy)-ethyl]-, N-[(poly)-(hydroxypropoxy)-propyl]-, N-methoxy propyl-, N-cyanomethyl-, N-cyanoethyl-, N-cyanopentyl-, N-methoxy carbonyl methyl-, N-ethoxy carbonyl ethyl-, N-aminoethyl-, N-ethylaminopropyl-, N-dimethylaminobutyl-, N-cyclopentyl-, N-cyclohexyl-, N-benzyl-, N-phenethyl-, N-phenyl-, N-tolyl-, N-chlorophenyl-, N-dimethylaminophenyl-, N-methoxyphenyl-tetrahydro-1H-imidazo-[1,2-a]-imidazole, -methyl-tetrahydro-1H-imidazo-[1,2-a]-imidazole, -dimethyl-tetrahydro-1H-imidazo-[1,2-a]-imidazole, -hexahydro-2H-pyrimido-[1,2-a]-pyrimidine, -hexahydro-imidazo-[1,2-a]-pyrimidine, -tetrahydro-imidazo-[1,2-a]-pyrimidine, -dihydro-imidazo-[1,2-a]-benzpyrimidine; -dihydro-benzimidazo-[1,2-a]-pyrimidine, -hexahydro-imidazo-[1,2-a]-diazepine, -octahydropyrimido-[1,2-a]-diazepine, -octahydro-diazepino-[1,2-a]-diazepine.

Instead of using the guanidines as such, it is of course also possible to use guanidine-formers, i.e., compounds which are capable of reacting with the polyamines corresponding to the above formula which are used for hardening to form guanidines. Such compounds include, in particular, cyanamide and also carbodiimides, such as dicyclohexyl carbodiimide. Where such "guanidine-formers" are used, it is advisable to react the polyamines used in the process according to the present invention with the "guanidine-formers" beforehand to form a mixture of excess polyamines and guanidine compound.

In the present process, the essential catalysts may also be used in the form of adducts (salts) thereof with inorganic or organic acids, although this embodiment is less preferred. Acids suitable for salt formation are in particular weak acids, i.e., acids having a pKa of above about 2.5, such as acetic acid or benzoic acid.

In addition to the reactants and catalysts mentioned above, other constituents may be used for producing the ready-to-use mixtures using the guanidine catalysts in accordance with the present invention. For example, the hardness of the reaction products may be increased by using epoxide resins. In addition, the properties of the reaction products may be modified by using fillers, such as kaolin, chalk or heavy spar; pigments, such as titanium dioxide, solvents, such as toluene, xylene, butyl acetate or ethylene glycol monomethyl ether acetate; plasticizers such as dioctyl phthalate, thickeners and extenders, such as coal tar or bitumen oils.

The mixtures accelerated in the reactivity thereof by the use according to the present invention are particularly suitable for the production of coatings and cast resins which are required to show particular elasticity. For example, it is possible to produce roof coatings, floor coverings and molding compositions. Combinations with epoxide resin are preferred as anti-corrosion coatings on steel, being characterized by the high elasticity and bond strength thereof.

The process of the invention this means the reaction between the blocked polyisocyanates and the polyamines is generally carried out at a temperature of from about −10° C. to about 150° C., preferably from about 5° C. to about 60° C. and most preferably from about 15° to about 35° C.

EXAMPLES

EXAMPLE 1

Production of a trifunctional polyether containing terminal carbamic acid-(4-nonylphenyl-ester)-groups:

1000 g of a trifunctional polypropylene glycol having an OH number of 56, obtained in known manner by the anionic polymerization of propylene oxide with 1,1,1-trimethylol propane or its sodium alcoholate as starting components, and 150 g of 2,4-tolylene diisocyanate are mixed at from 20° to 25° C. The mixture is heated with stirring for 5 hours to 70° C., after which it has an NCO content of 3%, by weight. 5 g of dibutyl tin dilaurate and 190 g of a technical 4-nonyl phenol mixture containing branched nonyl radicals are added to the polyisocyanate prepolymer cooled to from 20° to 25° C. The mixture is then heated with stirring for another 4 hours to 70° C. Thereafter, the product contains hardly any isocyanate and has an equivalent weight of approximately 1630.

EXAMPLE 2

In this and in the following examples the reaction between blocked polyisocyanates and polyamines is carried out at 23° C. unless otherwise indicated.

Production of a bifunctional polyether containing terminal carbamic acid phenyl ester groups:

1000 g of a bifunctional polypropylene glycol having an OH number of 31, obtained in known manner, and 96.7 g of 2,4-tolylene diisocyanate are mixed at from 20° to 25° C. The mixture is heated with stirring for 5 hours to 70° C. 50 g of dibutyl tin dilaurate and 52 g of phenol are added to the polyisocyanate prepolymer cooled to from 20° to 25° C. The mixture is then heated with stirring for another 4 hours to 70° C. Thereafter, the product contains hardly any isocyanate and has an equivalent weight of approximately 2400.

EXAMPLE 3

Production of a hardenable mixture of the product containing carbamic acid ester groups corresponding to Example 1 and polyamine:

100 g of a product according to Example 1 are mixed with 6 g of 3,3'-dimethyl-4,4'-diaminodicyclohexylmethane. The reaction mixture obtained has a processing time of approximately 4 hours and a driving time of approximately 17 hours. The mechanical properties of the end product are characterized by the following values:

| | |
|---|---|
| Shore hardness A according to DIN 53505 | 73 |
| Ultimate tensile strength according to DIN 53455 in MPa | 3.77 |
| Breaking elongation according to DIN 53455 in % | 308 |
| Tear propagation resistance according to DIN 53515 in kN/m | 11.75 |

EXAMPLE 4

Acceleration of the reaction mixtures by the catalysts according to the present invention:

The processing and hardening time of mixtures according to Example 3 was determined as follows after addition of the catalysts listed in the following Table:

| Catalyst | | Quantity added in g | Processing time in mins. | Drying time in mins. |
|---|---|---|---|---|
| A | 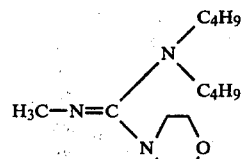 | 2 | 9 | 25 |
| B | 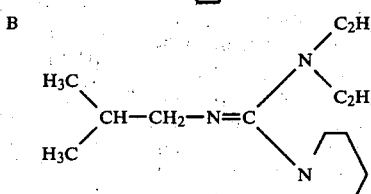 | 2 | 3 | 420 |
| | | 4 | 1 | 420 |
| C | 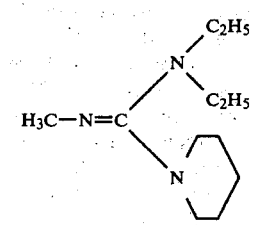 | 2 | 2 | 240 |
| | | 4 | 1 | 140 |

-continued

| Catalyst | Structure | Quantity added in g | Processing time in mins. | Drying time in mins. |
|---|---|---|---|---|
| D | (CH$_3$)$_3$C—N=C(N(CH$_3$)$_2$)$_2$ | 2<br>4 | 1<br>1 | 25<br>120 |
| E | (CH$_3$)$_2$(H$_3$C)C—N=C(piperidinyl)$_2$ | 2<br>4 | 1<br>1 | 40<br>300 |
| F | cyclohexyl-N=C(morpholinyl)$_2$<br>50% solution in benzyl alcohol | 4<br>8 | 22<br>11 | 135<br>75 |
| G | N≡C—CH$_2$—CH$_2$—N=C(N(CH$_3$)$_2$)$_2$ | 2<br>4 | 8<br>4 | 40<br>45 |
| H | cyclohexyl-N=C(NH—CH$_2$—CH$_2$—NH) (cyclic imidazolidine) | 2<br>4 | 4<br>2 | 45<br>15 |
| I | 2-piperidino-4,5-dihydroimidazole (NH form)<br>50% solution in ethanol | 4<br>8 | 5<br>3 | 35<br>35 |
| K | 1-butyl-2-imino-imidazolidine | 2<br>4 | 50<br>17 | 300<br>210 |
| L | 1-methyl-2-imino-imidazolidine | 2<br>4 | 30<br>8 | 150<br>100 |
| M | bis(imidazolin-2-yl)-N,N'-ethane | 2<br>4 | 45<br>18 | 270<br>420 |

-continued

| Catalyst | Quantity added in g | Processing time in mins. | Drying time in mins. |
| --- | --- | --- | --- |
| N ![structure: bicyclic amidine with N—C4H9] | 2<br>4 | 1<br>1 | 8<br>400 |
| O ![structure: bicyclic amidine with N—CH2—CH2—C≡N] | 2<br>4 | 3<br>1 | 15<br>60 |
| P ![structure: o-tolyl-NH-C(=NH)-NH-C(=NH)-NH2] | 2<br>4 | 4<br>9 | 180<br>240 |
| Q ![structure: imidazoline-NH · CH3COOH] | 2 | 110 | 500 |

EXAMPLE 5

Production of a hardenable mixture of the product containing carbamic acid ester groups according to Example 1 and polyamine/coal tar:

60 g of a product according to Example 1 are homogeneously mixed with 40 g of a standard commercial alkane sulfonic acid aryl ester plasticizer. This mixture is hardened using a mixture of 3.6 g of 3,3'-dimethyl-4,4'-diaminodicyclohexyl methane and 46.4 g of a standard commercial liquid coal tar. The reactivity of the reaction mixture is determined by the isothermal change in viscosity over a period of 30 minutes.

| Reaction time in minutes | Viscosity in mPa . s at 20° C. |
| --- | --- |
| 5 | 13440 |
| 15 | 13680 |
| 25 | 14040 |
| 30 | 14160 |

EXAMPLE 6

Reaction acceleration of the hardenable mixture according to Example 5, particularly after prolonged storage:

I. The replacement of 2 g of liquid coal tar by 2 g of catalyst L of the Example 4 in a reaction mixture corresponding to Example 5 produced a distinct acceleration of the reaction.

| Isothermal Change in Viscosity | |
| --- | --- |
| Reaction time in minutes | Viscosity in mPa . s at 20° C. |
| 5 | 12960 |
| 15 | 17280 |
| 25 | 23160 |
| 30 | 27120 |

This reaction acceleration remained intact, even after the two reaction components had been stored separately for 28 days at 52° C.

| Isothermal Change in Viscosity | |
| --- | --- |
| Reaction time in minutes | Viscosity in mPa . s at 20° C. |
| 5 | 13440 |
| 15 | 19680 |
| 25 | 26640 |
| 30 | 30720 |

II. The replacement of 1 g of liquid coal tar by 1 g of catalyst P of Example 4 in a reaction mixture corresponding to Example 5 also produced a distinct increase in the reaction velocity.

| Isothermal Change in Viscosity | |
| --- | --- |
| Reaction time in minutes | Viscosity in mPa . s at 20° C. |
| 5 | 12840 |
| 15 | 16320 |
| 25 | 19200 |
| 30 | 20880 |

After the two reaction components had been stored separately for 28 days at 50° C., it was not possible to observe a deterioration in the activity of the catalyst.

| Isothermal Change in Viscosity | |
| --- | --- |
| Reaction time in minutes | Viscosity in mPa . s at 20° C. |
| 5 | 15720 |
| 15 | 21120 |
| 25 | 27360 |
| 30 | 30720 |

EXAMPLE 7

Production of a hardenable mixture of the product containing carbamic acid ester groups according to Example 2 and polyamine:

100 g of a product according to Example 2 are mixed with 25 g of trioctyl phosphate and 5 g of 3,3'-dimethyl-4,4'-diamino-dicyclohexyl methane. The reaction mixture obtained has a hardening time of 7 hours.

EXAMPLE 8

Acceleration of the reaction mixture according to Example 7:

A reaction mixture according to Example 7 was accelerated with (a) 1 g of catalyst L from Example 4 and (b) 1 g of catalyst P from Example 4. It was possible in this way to shorten the hardening times (a) to 2.5 hours and (b) to 2 hours.

EXAMPLE 9

Production of a molding composition containing filler and plasticizer:

60 g of a product according to Example 1 are mixed and ground with 40 g of a standard commercial sulfonic acid ester plasticizer, 40 g of kaolin and 5 g of titanium dioxide pigment. The resulting mixture is hardened with a mixture of 3.6 g of 3,3'-dimethyl-4,4'-diaminodicyclohexyl methane and 6.4 g of the above-mentioned plasticizer. The reaction mixture obtained has a processing time of approximately 9 hours and a drying time of approximately 35 hours.

The following mechanical properties were determined on the elastic end product:

| | |
|---|---|
| Shore hardness A according to DIN 53505 | 52 |
| Ultimate tensile strength according to DIN 53455 in MPa | 1.6 |
| Breaking elongation according to DIN 53455 in % | 180 |
| Tear propagation resistance according to DIN 53515 in kN/m | 0.3 |

EXAMPLE 10

Acceleration of the reaction mixture according to Example 9 by the addition of catalyst P from Example 4:

By adding 2 g of a catalyst P from Example 4, it was possible to shorten the drying time to about 3 hours for a processing time of approximately 45 minutes. The mechanical properties determined on the elastic end product largely correspond to those of the product of Example 9, in other words, the mechanical properties are not affected by addition of the catalyst.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyureas by reacting organic polyisocyanates containing blocked isocyanate groups with organic compounds containing at least two primary and/or secondary amino groups in the presence of catalysts which accelerate the condensation reaction of the above-mentioned starting materials, characterized in that compounds containing at least one guanidine group corresponding to the formula:

are used as catalysts.

2. The process as claimed in claim 1 wherein the polyisocyanates containing blocked isocyanate groups are formed by reacting polyisocyanates with phenolic compounds to produce carbamic acid aryl ester end groups.

3. The process as claimed in claim 2 wherein the phenolic compounds comprise a member selected from the group consisting of phenol; o-, m- and p-cresol; and phenols substituted with $C_4$–$C_{18}$ alkyl radicals.

4. The process as claimed in claim 1 or 2, characterized in that the catalysts used are compounds corresponding to the following general formula:

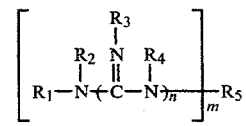

wherein
m represents 1 or 2,
n represents 1, 2 or 3 when m represents 1 and n represents 1 when m represents 2
$R_1$, $R_2$, $R_3$ and $R_4$ which may be the same or different, represent hydrogen, alkyl, cycloalkyl, aralkyl, alkaryl or aryl radicals which optionally contain inert substituents and/or are interrupted by structural units corresponding to the formulae —O—, —S— or =N—$R_6$
wherein $R_6$ represents $C_1$–$C_4$ alkyl or phenyl and $R_5$ represents either a monofunctional radical of the type mentioned in the definition of $R_1$ to $R_4$ or an alkylene radical containing from 2 to 4 carbon atoms;
when n represents 1, two of the radicals $R_1$, $R_2$, $R_3$, $R_4$ and $R_5$ may optionally be cyclically attached to one another.

5. The process as claimed in claim 1, characterized in that the guanidine compounds are used in the form of their salts with inorganic or organic acids.

6. The process as claimed in claim 4, characterized in that said catalysts are used in the form of their salts with inorganic or organic acids.

* * * * *